United States Patent [19]

Marzouki et al.

[11] 4,294,733

[45] Oct. 13, 1981

[54] ADHESIVE FOR DOUBLE GLAZING UNITS

[75] Inventors: Taieb Marzouki; Bernd Schwisser, both of Taunus, Fed. Rep. of Germany

[73] Assignee: USM Corporation, Farmington, Conn.

[21] Appl. No.: 26,064

[22] Filed: Apr. 2, 1979

[30] Foreign Application Priority Data

May 5, 1978 [GB] United Kingdom ............... 13236/78

[51] Int. Cl.³ .................... C08L 53/00; C08L 63/00; C08L 91/06
[52] U.S. Cl. ........................... 260/28.5 B; 260/28 P; 260/37 EP; 260/42.47; 428/34; 525/89; 525/92
[58] Field of Search ................. 525/92, 89; 260/28 P, 260/28.5 B, 37 EP, 42.47

[56] References Cited

U.S. PATENT DOCUMENTS

| | | | |
|---|---|---|---|
| 3,723,223 | 3/1973 | Compte | 525/92 |
| 3,753,936 | 8/1973 | Marrs | 525/92 |
| 3,792,005 | 2/1974 | Harlan | 525/92 |
| 3,870,676 | 3/1975 | Condon | 525/92 |
| 3,956,223 | 5/1976 | Chiang | 525/92 |
| 4,028,292 | 6/1977 | Korpman | 525/92 |
| 4,113,914 | 9/1978 | Doss | 260/837 R |
| 4,131,709 | 12/1978 | Schmuck | 525/92 |
| 4,169,822 | 10/1979 | Kutch | 525/92 |

FOREIGN PATENT DOCUMENTS 1207192 9/1970 United Kingdom .
1257073 12/1971 United Kingdom .
1285034 8/1972 United Kingdom .

*Primary Examiner*—Paul Lieberman
*Attorney, Agent, or Firm*—John P. Morley

[57] ABSTRACT

An improved two-part adhesive system particularly adaptable for preparing multi-pane glazing units and improved spacer frames for multi-pane glazing units.

26 Claims, 17 Drawing Figures

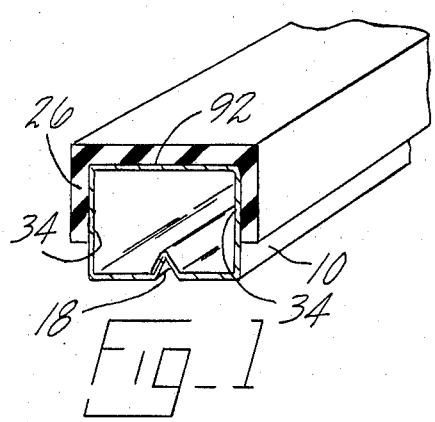
Fig_1
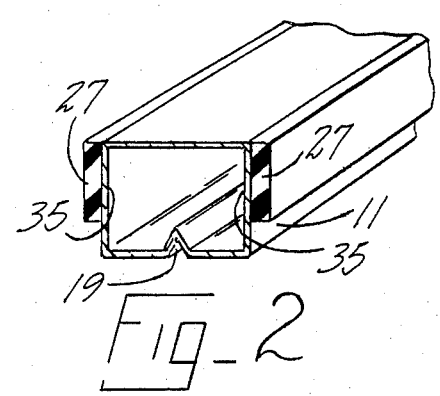
Fig_2
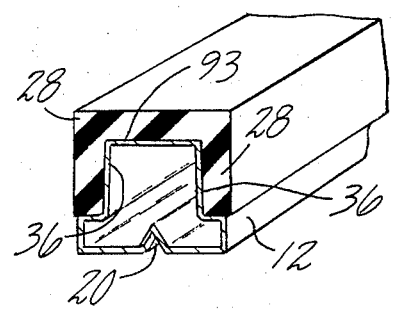
Fig_3
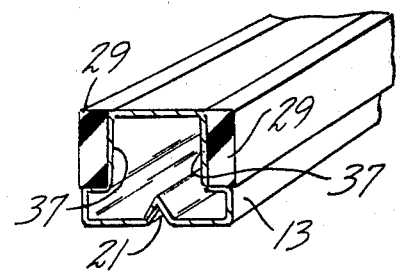
Fig_4
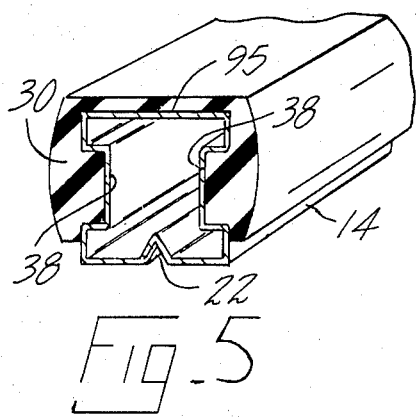
Fig_5
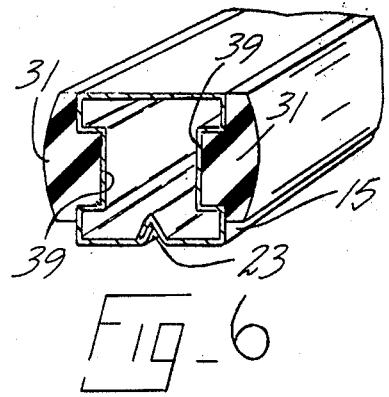
Fig_6

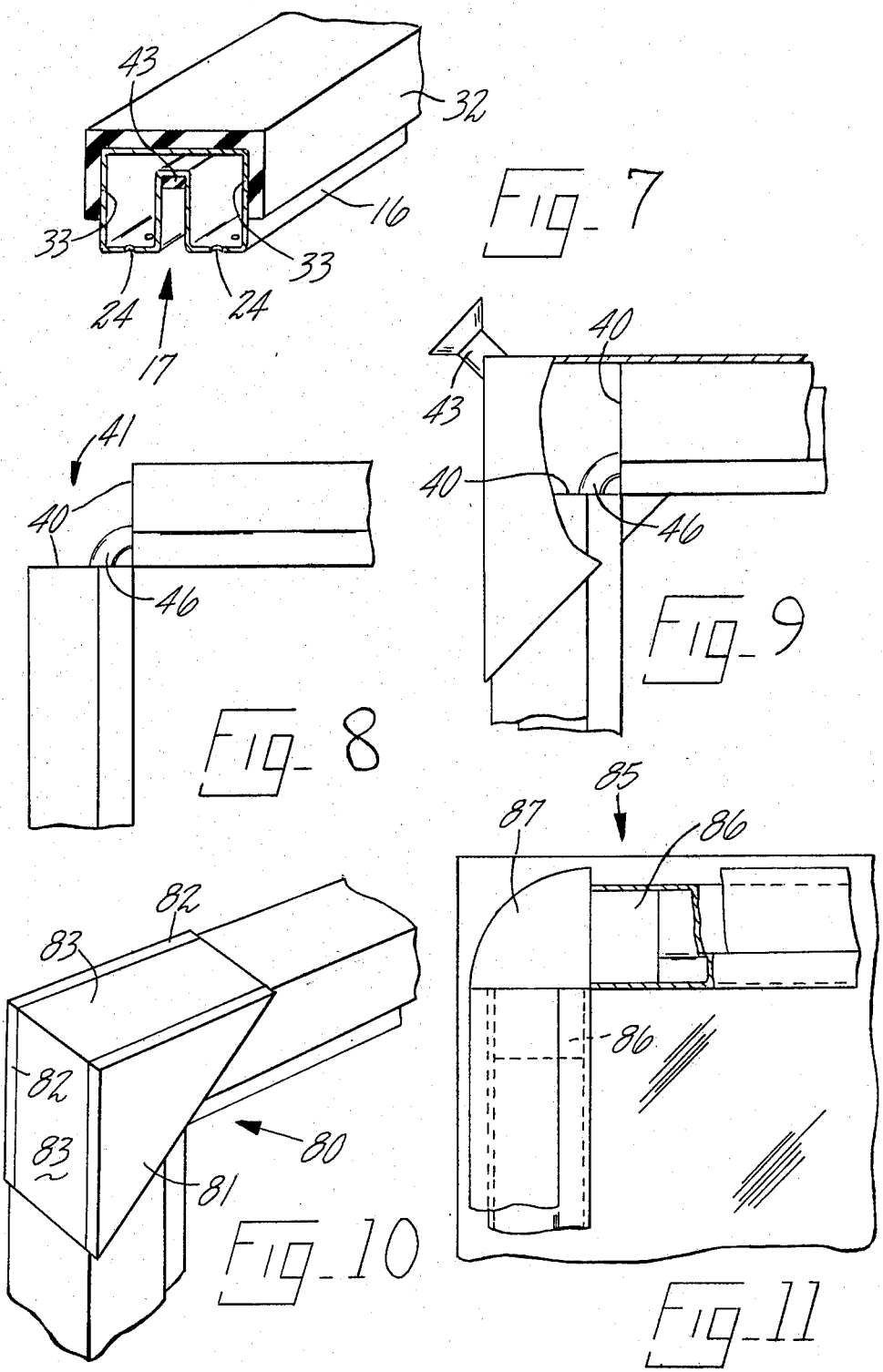

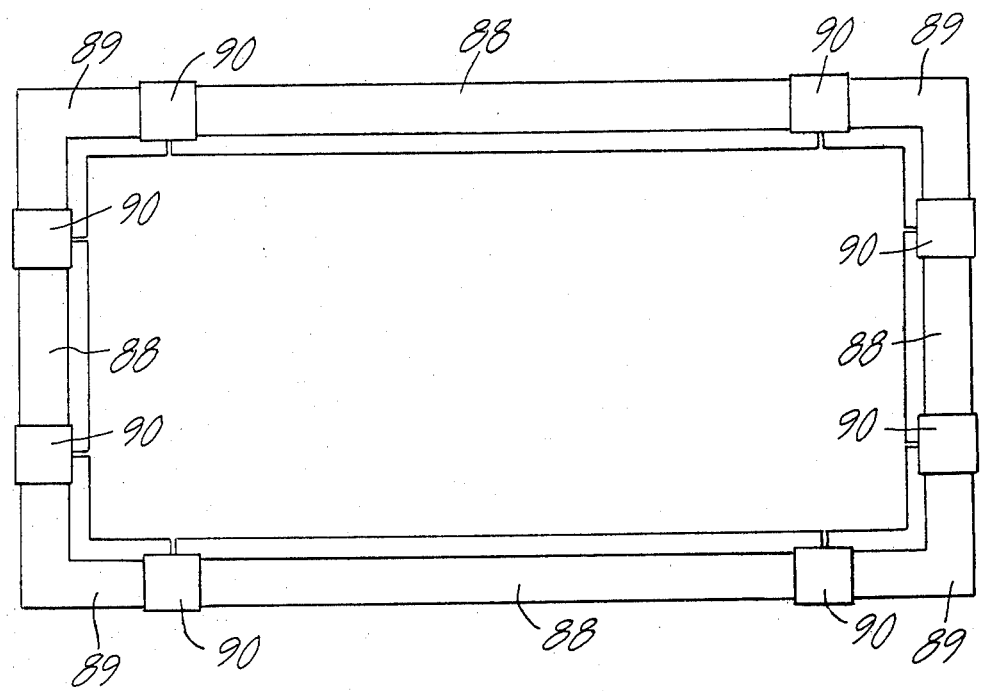
Fig_12
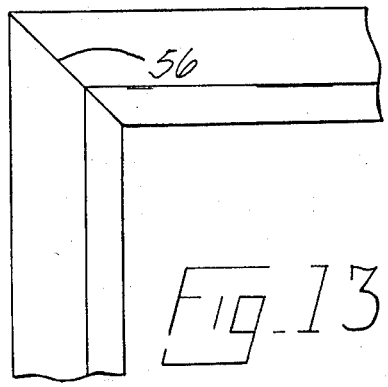
Fig_13
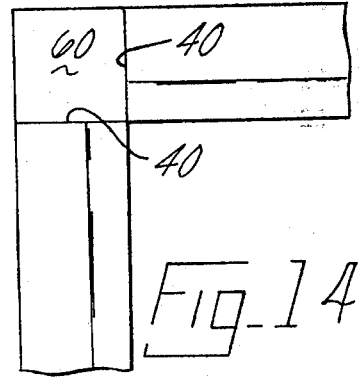
Fig_14

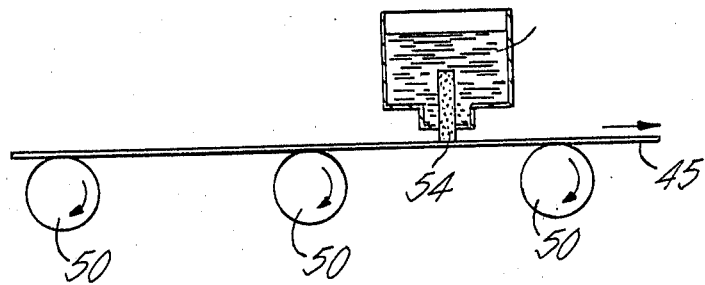
Fig_15
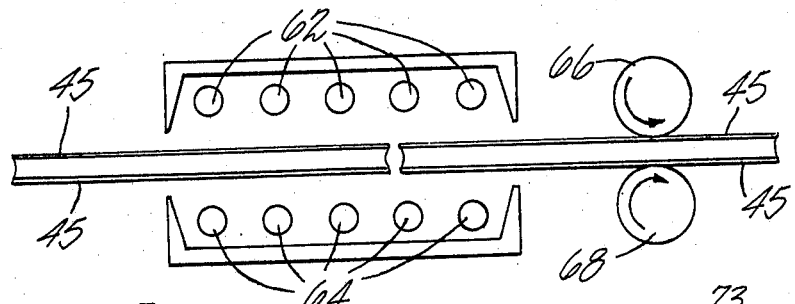
Fig_16
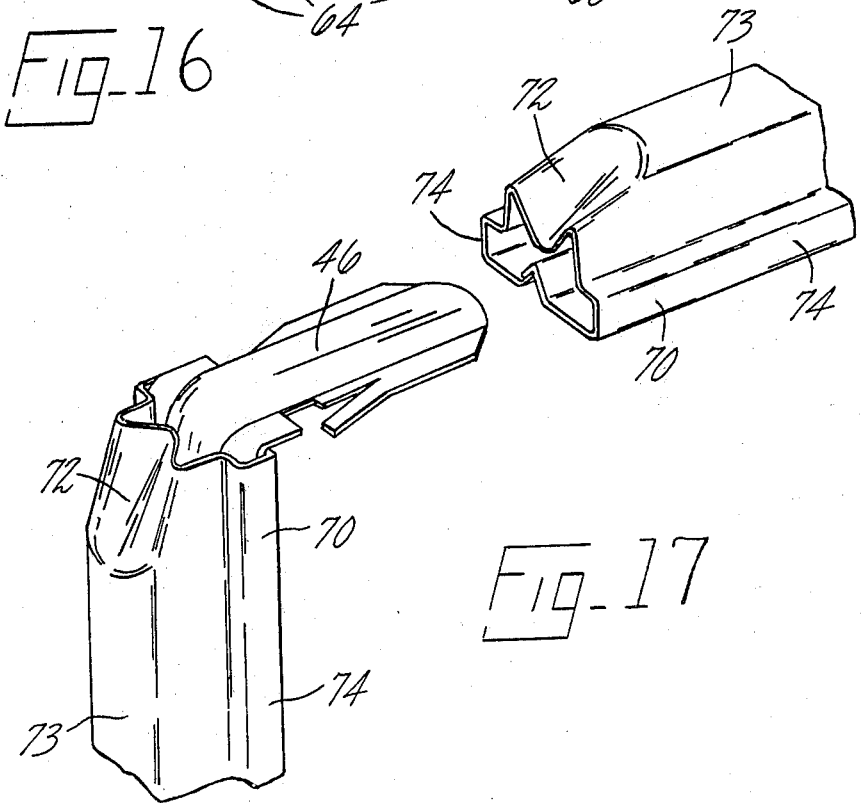
Fig_17

ADHESIVE FOR DOUBLE GLAZING UNITS

THE FIELD OF THE INVENTION

This invention relates to improved adhesives for manufacturing multi-glass panes or double glazing units and to articles coated with the improved adhesives which are used in the assembly of such units.

DESCRIPTION OF THE PRIOR ART

Multi-pane glazing units having glass panes separated by spacers and sealed with sealant compositions of various kinds are known to the art. The performance characteristics of sealant compositions suitable for use in multi-plane glazing units are well defined. The sealant must effectively seal or bond the glass and the spacer together (even at high temperatures and in the absence of additional support for the panes as may occur during storage) and provide a satisfactory seal against diffusion of water vapor. Additionally, the seal must retain these performance characteristics over a wide range of temperatures, e.g. in the range of minus 30° C. to plus 60° C. Moreover, it is also desirable that the sealant composition can be applied effectively and with ease, with a minimum of skill and without waste of material.

U.K. Specification No. 993963 discloses sealant compositions based on curable polysulphide compounds for double glazing. Such sealants have been used to provide satisfactory cured seals with good adhesion to glass and metal and good resistance to environmental temperature change. However, the disclosed materials are comparatively expensive, and when mixed they commence to cure immediately. Accordingly, metering and mixing of two parts are required just prior to application as a fluid to the edge of the unit. Additionally, it is necessary for these materials to be cured, at least to some extent, before the units can be safely handled and transported. This cure may take up to several hours and requires clamping and storage of the units during the cure period.

Hot melt double glazing sealant compositions based on butyl compounds are known. These sealant compositions are usually formulated with a view to providing a blend of properties, including ability for application as a heat softenable mass, good resistance to moisture vapor transmission and adhesion to glass and spacer materials. Although acceptable seals may be formed with such sealant compositions, many compositions based on butyl rubber have cohesive strength and adhesion to glass which is generally of a lower order than is the case with polysulphide or epoxy polysulphide sealants. Moreover, some components used to improve adhesive properties in the formulation of butyl based hot melt sealants, tend to provide seals which have poor resistance to flow when heated, or even at room temperature, or become unduly hard when cooled.

Various means of application of double glazing sealants have been proposed, for example devices which dispense quantities of metered and mixed polysulphides, and extrusion or gun devices for hot melts. As will be apparent, application of the sealants as fluids requires careful control if time consuming cleaning operations are to be avoided.

British Patent Specification No. 1384127 discloses multiple insulating glass units formed by use of sealant compositions based on thermoplastic rubber block copolymers of a specified type exemplified by styrene-butadiene-styrene and styrene-isoprene-styrene block copolymers. The specification indicates that the sealant may be employed as a coating on metal spacing sections for double glazing. However, sealants based on such block copolymers tend to have comparatively unacceptable adhesion characteristics for high quality double glazing, even when used in conjunction with a silane primer. Also, these sealants tend to demonstrate rather higher moisture vapor transmission than butyl based sealants.

It should be apparent from the above description that there is a need outstanding in the art for an efficient sealant composition and articles coated with the sealant which can be employed in a simple fashion in the manufacture of double glazing units.

SUMMARY OF THE INVENTION

The novel sealant compositions and articles coated with such sealants of the present invention are especially useful in manufacture of double glazing units. The adhesives can be extruded as a hot melt at 140° C. to 190° C. and harden to yield a non-tacky, cohesive elastic mass having a moisture vapor transmission rate (as later defined) of not more than 0.5 g/m²/day measured at 38° C. or less than 0.1 g/m²/day measured at 25° C. Essential ingredients of the sealant composition are a block copolymer having two polystyrene end blocks linked to an at least substantially saturated polyolefin rubber midblock, an aliphatic hydrocarbon resin of melting point not less than 60° C., an epoxy resin, and finely divided inorganic filler all combined to provide a heat softenable polymeric composition.

The particularly preferred embodiment of this invention provides a sealant composition formed by contacting and heating the heat softenable, polymeric sealant composition described above with a heat softenable polymeric primer composition comprising a curing agent for the epoxy resin.

In a preferred embodiment of the invention a primer composition is employed in the form of a solution or dispersion for applying a layer of primer to peripheral portions of panes and also to surfaces of spacer articles or elements used in the manufacture of double glazing units. The primer layer carrying panes and spacer articles (joined at their ends by clip elements) are assembled to provide a channel defined by surface portions of the spacer articles and peripheral surface portions of the panels. The polymeric sealant composition described before is applied to the channel as a heat softened tape or as a hot melt mass to contact the primer carrying layers.

In another particularly preferred embodiment, the polymeric sealant composition is applied to provide a tack-free layer or coating on selected spacer surfaces to provide pre-coated spacer articles or elements of the invention. These spacer articles or elements can be assembled in a closed figure of appropriate shape and size, with end portions of the spacer articles joined, e.g. by clip elements, to provide the spacer assembly. The spacer assembly can then be positioned between primer layer carrying panes so that the primer layers and sealant composition coating are in contact with each other. Heat and pressure can then be applied to cause the primer and sealant compositions to form a seal strongly bonding the panes to the spacer assembly. The heat and pressure may be applied in any convenient manner. For example, infra red (e.g. 1 to 3 microns wave length preferably 1 to 1.5 microns) radiation may be directed through glass panels to soften the surface of the sealant composition on the spacer assembly. The unit may also be passed to a press, e.g. a roller press set to apply pressure to the sealed unit to a pre-determined extent.

DESCRIPTION OF THE PREFERRED EMBODIMENTS

In a sealant composition according to the invention, the various components are selected with a view to required application and performance characteristics.

Block copolymers useful in sealants according to the present invention are block copolymers having two polystyrene end blocks linked to an at least substantially saturated polyolefin rubber mid-block. These materials are selected in view of their thermal and oxidative stability, low moisture vapor transmission rate, their good mechanical properties especially at ambient temperature and application characteristics. These materials may be described as containing at least two poly(alpha-monoalkenyl arene) blocks and at least one elastomeric hydrogenated polyconjugated diene block, for example hydrogenated polybutadiene or hydrogenated polyisoprene. The poly(alpha-monoalkenyl arene) blocks may have an average molecular weight ranging from about 4000 to about 50,000 or 150,000, preferably from about 7000 to about 25,000 and most preferably from about 7,500 to about 10,000. The alphamonoalkenyl aromatic monomer may be styrene, alpha-methylstyrene or alkyl ring substituted styrenes where the alkyl group contains 4 or less carbon atoms and there are 2 or less of these alkyl groups. The elastomeric poly(conjugated diene) block has an average molecule weight in the range of from 18,000 to about 250,000 or 500,000, preferably from 25,000 to about 100,000 and most preferably from about 27,000 to about 50,000. The poly(conjugated diene) block which is hydrogenated contains at least 20 percent, preferably at least 35 percent of the monomer units polymerized in the 1,2 configuration. Hydrogenation (saturation) of these poly(conjugated diene) blocks is carried out to a point where at least 95 percent of the double bonds are saturated, preferably at least 99 percent are saturated so that the mid-block comprises an at least substantially polyolefin rubber. Less than 10 percent of the aromatic double bonds of the poly(alpha-monoalkenyl arene) block are hydrogenated; preferably less than 2 percent are hydrogenated. Preferred materials are supplied by Shell Chemicals under the trade names KRATON G 1650 and KRATON G 1652. These preferred materials are described as thermoplastic rubbers having molecules which include polystyrene end blocks (S) and incompatible polyolefin rubber mid-blocks (EB) to an extent of about 70% by weight. The polyolefin rubber midblocks are said to provide an ethylene-butylene rubber phase.

In a sealant composition according to the invention, the block copolymer may be employed in quantities from 5 to 50 parts by weight of the polymeric sealant compositions. Desirable cohesive strength, elasticity and moisture vapor transmission properties are achieved with as little as 9 to 30 parts by weight (more preferably 14 to 20) per 100 parts by weight of the sealant composition.

The aliphatic hydrocarbon resins used in adhesive compositions of this invention are tackifying resin conferring required hot tack properties to the heat softened composition, and also serve as a melt viscosity modifier at lower temperatures. In those cases where the composition is applied as a heat softenable layer or coating on spacer elements it is important that the resin used should not confer tackiness on the composition at ambient temperatures of storage and transit (i.e. up to about 50° C., more normally 0° C. to 35° C.). Greater quantities of the aliphatic resin tend to lead to desirably low melt viscosity and wetting characteristics and also to poorer low temperature properties of the final seal, i.e. to hardness and brittleness of the seal, which may manifest itself in breakage of the sealed panes and in other ways. Correspondingly, smaller quantities of the resin tend to render the sealant more difficult to apply and to difficulties of wetting-out of the melt. Preferred amounts of aliphatic resins are between about 5 to 50 parts by weight, preferably 12 to 30 parts by weight (more preferably 15 to 20 parts by weight) per 100 parts by weight of the polymeric sealant composition.

Suitable reactive epoxy resins for use in sealant compositions of the invention are liquids at room temperature and include those having molecular weights less than 3000 and epoxide equivalents of 180 to 210. A preferred material is that supplied as EPIKOTE 828, which is derived from epichlorhydrin and diphenylolpropane, is liquid at room temperature, and has an epoxide equivalent of 185 to 205, more specifically about 190 (grams of resin containing one gram equivalent of epoxide), a viscosity at 25° C. (Garner-Holdt) of 100 to 160 poise, more specifically about 125 poise, and an average molecular weight of 370. Larger quantities of epoxy resin appear to promote faster adhesion but the amount of epoxy resin employed is limited somewhat by compatibility of the epoxy with other components of the composition. Amounts from about 2 to about 40 parts by weight are generally acceptable, but preferred amounts are from about 4 to about 15 parts by weight epoxy resin (more preferably about 8 parts by weight) per 100 parts by weight of the polymeric sealant composition. The preferred epoxy resin also serves to some extent as a plasticizer for the sealant composition.

Finely divided inorganic filler(s) e.g. calcium carbonate, zinc oxide, barytes, clay, talc or others ( and mixtures) is included in order to promote handling properties of the melted sealant composition. Substantial quantities of filler may be used, i.e. up to about 60, or even 80, parts by weight per 100 parts by weight of the polymeric sealant composition, but preferred amounts of filler are between about 10 to about 45 parts by weight filler (more preferably from about 20 to about 40 parts by weight) per 100 parts by weight of the polymeric sealant composition. Also, where the sealant composition is to be heated by infra red radiation it is desirable to include up to about 15, more preferably up to about 8 parts by weight carbon black per 100 parts by weight of the polymeric sealant composition.

If desired, up to about 50 parts by weight of an aromatic hydrocarbon resin having a melting point (Ball & Ring) of from 60° C. to 130° C. may be included per 100 parts by weight of the sealant composition. Excessively large quantities of aromatic resin tend to promote undesirable hardness in the final seal but certain quantities of this resin contribute to desirable low melt viscosity, high cohesion and hot tack of the sealant composition. Also, the cold composition is likely to have very little tackiness at normal temperatures of transport and storage. Preferred amounts of aromatic hydrocarbon resins used are no more than about 20 parts by weight of aromatic resin per 100 parts by weight of the polymeric sealant composition.

Sealant compositions of this invention may also include up to about 40 parts by weight per 100 parts by weight of the polymeric sealant composition of a liquid polybutene having a molecular weight less than 10,000. The polybutene serves as a low temperature plasticizer for the composition and final seal, and also contributes to rubbery characteristics of the seal and reduces melt viscosity of the sealant composition. Preferred amounts are between about 10 to 30 parts by weight polybutene (more preferably from about 15 to about 20 parts by weight) per 100 parts by weight of the sealant composition.

The non-tacky nature of the cooled polymeric sealant composition at ambient temperatures of storage and transit, may be enhanced by including up to about 15 parts by weight, more preferably up to about 10 parts by weight, (per 100 parts by weight of the polymeric sealant composition) of a wax with a melting point (Ball & Ring) from 50° C. to 120° C., for example a paraffin wax of melting point 100° C. Other resins, for example polyethylene, atactic polypropylene, ethylene vinyl acetate, and polyisobutylene and additives may be included, as extenders, fillers and hot tackifiers and stabilizers if desired.

Polymeric compositions described above can provide sealant compositions which are capable of extrusion as a hot melt and harden to yield a non-tacky cohesive elastic mass having a moisture vapor transmission rate (as defined) of less than 0.1 g/m$^2$/day, measured at 25° C. or less than 0.5 g/m$^2$/day measured at 38° C. The compositions are non-tacky at temperatures up to 50° C., storage stable (as to shape and composition) for lengthy periods at ambient temperatures of storage and transit, and capable of being melted and held molten at 140° C. to 150° C. for several hours without deleterious effects, for application as a hot melt at 150° C. to 190° C.

Moisture vapor transmission rate (MVTR) as used here, means the weight of moisture vapor transmitted per day through a foil 2.0 mm thick of the composition from a 90%±2% relative humidity (R.H.) atmosphere at one side of the foil into a dry atmosphere at the other side of the foil (expressed as g/m$^2$/day) as determined according to DIN 53122 (test conditions A). MVTR values are dependent on the temperature and relative humidity at which the test is carried out. Values are given here at 90% R.H. at temperatures of 20° C.±1° C. and 38° C.±1° C.

Adhesion to glass and aluminium of sealant compositions described before are significantly improved when used in combination with a heat softenable primer composition comprising a curing agent for the epoxy resin. The curing agent is a material which will chemically react with or catalyze reaction of the epoxy resin and may be for example a material containing one or more of the groups —NH$_2$; >NH and $$\diagdown \!\!\! \diagup \atop \underset{|}{N}\cdot$$

Preferred curing agents are a liquid tertiary amines since problems of precise stoichiometric mixing are avoided. A preferred tertiary amine is 2.4.6.-tris-dimethylamino-methylphenol.

A primer composition according to the invention, preferably comprises a solvent borne solution (e.g. a 20% by weight solution), of a tertiary amine a heat reactive phenolic resin, and a block copolymer. The block copolymer is preferably a block copolymer having two polystyrene end blocks linked to an at least substantially saturated polyolefin rubber mid-block as already described, but may be mixed with or substituted by a polystyrene-polybutadiene polystyrene block copolymer or a polystyrene-polyisoprene-polystyrene block copolymer or a mixture thereof. In the preferred primer compositions, the block copolymer is used in sufficient quantities to ensure thermoplasticity of the compound, and compatibility of the compound of the primer composition with the sealant composition. In order to achieve good tensile strength and elasticity of the final seal, the preferred polystyrene-polyolefin rubber-polystyrene block copolymer (mentioned before) are employed in amounts up to about 40% by weight of the primer composition. However, if the preferred block copolymers are diluted or mixed with other block copolymers, amounts up to about 60% by weight of block copolymer by weight of the primer composition may be used. Particularly preferred amounts of block copolymers are from about 10 to about 30 parts by weight of the preferred block copolymer per hundred parts by weight of the primer composition.

In the preferred primer composition, a heat reactive phenolic resin is included in order to promote adhesion to glass. The heat reactive phenolic may be any one or more of the commonly available heat reactive phenolic resins having a melting point (Ball & Ring) below 130° C. and being compatible with other components of the primer and sealant compositions. The preferred amounts of the phenolic resin(s) used are amounts between about 2 to about 40 parts by weight (more preferably from about 5 to about 20 parts by weight) per hundred parts by weight of the compound.

The amount of tertiary amine in the primer composition is not especially critical. However, the amount of tertiary amine used in the preferred primer compositions is chosen in appropriate proportion to the amount of epoxy resin employed in the sealant composition, and also so as to ensure that the final seal is not unduly weakened by presence of liquid amine. Amounts of tertiary amine between about 0.25 to about 20 parts by weight (more preferably from about 1 to about 7 parts by weight) of the tertiary amine per hundred parts by weight of the compound may be employed.

In a preferred method of use of the compositions of the present invention, the primer composition is applied to edge portions of glass panels and to selected surfaces of spacer elements to provide a thin film or layer of heat softenable, thermoplastic, polymeric material adherent to the glass or to the spacer. Preferably primer composition layers are applied as a solution of the primer composition in volatile organic solvent. Suitable solvents are those which wet glass readily, and evaporate readily to leave a uniform thin film of primer composition, for example not more than 0.5 mm thick, and preferably not more than 0.05 mm thick.

A tackifying resin is included in the primer composition to ensure that the applied film or layer is heat softenable to a tacky condition by heat from or heating of the sealant composition. Suitable tackifying resins include aliphatic hydrocarbon resins of melting point (Ball & Ring) of 60° C. to 150° C., e.g. ESCOREZ 5280, 5300, 5310 or 5320, EASTOREZ 100, QUINTONE B 170, or an alicyclic resin having a melting point (Ball & Ring) of 60° C. to 150° C. The tackifying resin may be used in amounts up to about 80 parts by weight per 100 parts by weight of the primer composition. Larger amounts of the material lead to compounds of lower melt viscosity having improved tack at higher temperatures and good green strength of bonds to glass. However, excessive amounts of such resins may lead to unwanted brittleness of the applied film of compound. Preferred amounts of tackifying resin are amounts between about 20 to about 40 parts by weight of the aliphatic hydrocarbon resin per hundred parts by weight of the primer composition. Additionally or alternatively, the primer compositions may include up to about 80 parts by weight per hundred parts by weight of the primer composition of an aromatic hydrocarbon resin having a melting point (Ball & Ring) of 50° C. to 150° C., e.g. Piccotex LC120, (δ-methyl styrene/vinyl toluene), Amoco Resin 18 (δ-methyl styrene), Piccovar 130 (alkyl aromatic hydrocarbon). These aromatic hydrocarbon resins also contribute to lower melt viscosity and hot tackiness of the compound, and to cohesive properties of the compound. However, larger amounts tend to lead to harder, more brittle films of the applied primer composition. Preferably less than about 40 parts by weight of this aromatic hydrocarbon resin(s) per hundred parts by weight of the primer composition are used. The primer compositions may also include with the aromatic hydrocarbon resins, polyterpene resins (e.g. NIREZ 1115, ZONARES B115, PICCOLYTE) and/or hydrogenated rosin esters (e.g. FORAL 85 or 105, STAYBELITE ESTER 10).

Where tacky primer composition layers are required, appropriate additional resins may be included. Other known adhesion promoters, resins and rubbers may also be included, for example silane, post-chlorinated polyvinyl chloride or terpolymers of vinyl chloridevinyl acetate and maleic acid, but these are not preferred. Stabilizers or antioxidants may also be included, for example benzotriazole derivatives, polymeric hindered phenols, zinc-dibutyl-dithiocarbonate, pentaerythritoltetra-kis [3-(3,5-diterbutyl-4-hydroxyphenyl) propionate]. Pigments may be included in the primer composition, and this may be desirable where for example infra red heating of the composition is to be carried out.

Primer compositions described above can provide layers of the composition firmly adherent to the panes and/or spacer articles or elements which is compatible with and may become adherent to composition, and has a softening point (Ring & Ball) in the range between about 50° C. to about 190° C. so as to be heat softenable therewith, and preferably in the range between about 80° C. to about 150° C.

In manufacturing double glazing units sealed by compositions of the invention, spacer means are used which comprise spacer elements which are hollow, to accept dessicant, and perforated or slit on that surface intended to be exposed to the inside of the unit. Preferably the spacer elements are of metal e.g. aluminium or steel and are also somewhat resilient to permit relative movement of the spaced apart panes. Various cross-sectional designs of spacer elements may be used and preferred designs of spacer element may be used and preferred designs we prefer to select are those providing that the surfaces intended to abut inner surfaces of the glass panes are substantially parallel and uniform so that a satisfactory disposition may be secured in the final unit.

In a preferred manner of using sealant compositions of the invention, pre-coated spacer articles are employed which may be prepared in the following way.

Selected surfaces of the spacer article or element are treated with a primer composition according to the invention to provide a thin, heat softenable layer or film on those surfaces. The sealant composition is then applied as a hot melt at 150° C. to 190° C. onto the primer layer to provide a layer at least 0.1 mm thick, having a uniform profile of desired external geometry. The layers harden on cooling to a tough, elastic, non-tacky condition, so that after cooling, the pre-coated spacer article can be transported and/or stored without use of any special coating or interleaving layers. At the time of use to produce a double glazing unit, the precoated spacer articles are sawed into required lengths for assembly between the panes and the lengths joined together in a suitable fashion.

The present invention also provides a spacer article of uniform cross-section throughout its length useful in manufacturing double glazing units comprising a hollow body portion and carrying on selected surfaces a layer of a heat softenable elastic sealant composition which is shape retaining and non-tacky at temperatures below 60° C. and capable of softening to bond-forming condition when heated to temperatures above 140° C. and which comprises a polystyrenepolyolefin-polystyrene block copolymer, an aliphatic resin of melting point not less than 60° C., an epoxy resin, and finely divided inorganic filler.

In order that the above and others of the several aspects of the invention may be more clearly understood, there now follows a description to be read with the drawings accompanying the provisional specification of example sealant compositions and primer compositions, various example spacer elements, and their use in manufacture of double glazing units. It will, of course, be understood that these various example compositions and spacer elements, have been selected for description to demonstrate and illustrate the invention by way of example and not by way of limitation thereof.

In the drawings:

FIG. 1 is a diagrammatic view of a first illustrative precoated spacer article;

FIG. 2 is a diagrammatic view of a second illustrative precoated spacer article;

FIG. 3 is a diagrammatic view of a third illustrative precoated spacer article;

FIG. 4 is a diagrammatic view of a fourth illustrative precoated spacer article;

FIG. 5 is a diagrammatic view of a fifth illustrative precoated spacer article;

FIG. 6 is a diagrammatic view of a sixth illustrative precoated spacer article;

FIG. 7 is a diagrammatic view of a seventh illustrative precoated spacer article;

FIG. 8 is a diagrammatic view of a corner joint between spacer elements;

FIG. 9 is a diagrammatic view of a device employed in preparing spacer articles for use in the first illustrative method;

FIG. 10 is a diagrammatic view of a corner joint between spacer articles;

FIG. 11 is a diagrammatic view of another corner joint between spacer articles;

FIG. 12 is a diagrammatic view of another spacer article;

FIG. 13 is a diagrammatic view of another corner joint between spacer articles;

FIG. 14 is a diagrammatic view of another corner joint between spacer articles;

FIG. 15 is a diagrammatic view of means for applying a first part of the composition to glass panels;

FIG. 16 is a diagrammatic view of means for applying heat and pressure in the production of double glazing units; and FIG. 17 is an exploded diagrammatic view of a corner joint between spacer articles.

Various example sealant compositions and primer compositions were prepared comprising components in the amounts by weight shown in Tables I and II. Of these, example primer compositions 1, 2 and 3 (Table I) are illustrative of primer compositions of the invention, example sealant compositions 1, 2, 3, 4, 7 and 8 (Table II) are illustrative of sealant compositions of the invention. Each of the illustrative sealant compositions has a softening point, Ring & Ball, in excess of 100° C., and an MVTR of less than 0.1 g/m²/day at 25° C., and an MVTR of not more than 0.5 g/m²/day at 38° C. The following Examples demonstrate the various properties of the illustrative compositions.

EXAMPLE I

In this example, the adhesion of sealant composition example 1 (referred to in Table I) with and without primer compositions was examined. In this example, triplicate sets of sample glass to aluminium bonds were formed with the sealant, there being a thickness of 15 mm of hardened seal between the glass pane and the aluminium, and glass to seal and aluminium to seal contact areas of 50 mm by 15 mm. To form the samples, a 15 mm wide cleaned glass plate and a 15 mm wide cleaned alumium profile were held spaced apart by 15 mm, to define a 50 mm long space between them, and then the sealant composition was injected into the space between them as a hot melt to completely fill the space or channel. In each case the sealant composition flowed well into the channel and formed an elastic seal at least lightly adherent to the glass plate and spacer. For a first set of samples, prior to assembling the samples, no pretreatment of the glass plates or spacers was performed; for a second set of samples, after application of the sealant composition (i.e. sealant composition example 1 alone) the samples were maintained for one hour at 180° C.; for a third set of samples, the peripheral portions of the glass plates were treated (prior to assembling the samples) with "primer composition example 4" (Table I) applied by wiping a thin film of the solution on to the glass plates with a sponge, and allowing the solvent to evaporate; for a fourth set of samples prior to assembling the samples, peripheral surface portions of the glass plates were treated with "primer composition example 1" (Table I) applied by wiping a thin film of the solution onto the glass plates with a sponge, and allowing the solvent to evaporate.

After the sealant had cooled to room temperature, two groups of samples were aged in different ways. One group of samples comprising triplicates of each of the first, second, third and fourth set of samples was aged for two days at 23° C., 50% relative humidity. A second group of samples comprising triplicates of each of the first, second, third and fourth sets of samples was aged for twenty one days under exposure to ultra-violet light and warm water. In this ageing procedure, the samples were immersed in the water with an upper sealant to glass interface coplanar with the surface of the water, and with a 275 watt UV lamp spaced 35 cm from and directed towards the upper surface of the glass plate. This group of samples were subjected to a tensile test according to DIN 52 455 in which the samples were pulled apart at 6 mm per minute.

The maximum load, maximum elongation, and type of adhesive failure were examined for each group of samples. The mean results for each triplicate set of samples are shown in Table III.

TABLE I

| | Example primer compositions | | | | | |
|---|---|---|---|---|---|---|
| | Example primer composition | | | | | |
| Component | 1 | 2 | 3 | 4 | 5 | 6 |
| Block copolymer (1) | 98% by weight of a | 20.0 | 24.5 | | 23.2 | 23.1 |
| Block copolymer (2) | primer composition | | | 25.0 | | |
| Hydrocarbon resin (aliphatic) | according to example 4, together with | 32.5 | 30.7 | 37.0 | 37.7 | 37.1 |
| Tertiary amine | 2.0 | 3.5 | 3.0 | 0 | 0 | 0 |
| Heat reactive phenolic resin | | 10.0 | 10.0 | 0 | 0 | 0 |
| Hydrocarbon resin (aromatic) | | 32.5 | 30.7 | 37.0 | 37.6 | 37.3 |
| Stabilizer 1 | | 1.0 | | | 1.0 | 1.0 |
| Stabilizer 2 | | | 0.6 | 0.5 | | |
| Stabilizer 3 | | 0.5 | 0.5 | 0.5 | 0.5 | 0.5 |
| Silane | | | | | | 1.0 |
| Total | 100.0 | 100.0 | 100.0 | 100.0 | 100.0 | 100.0 |
| Toluene | 400.0 | 150.0 | 150.0 | 400.0 | 400.0 | 400.0 |

TABLE II

| | Example sealant composition | | | | | | | |
|---|---|---|---|---|---|---|---|---|
| | Example sealant composition | | | | | | | |
| Component | 1 | 2 | 3 | 4 | 5 | 6 | 7 | 8 |
| Block copolymer (1) | 18.5 | 9.1 | 16.0 | 27.3 | 16.0 | | 14.1 | 14.7 |
| Block copolymer (2) | | | | | | 27.3 | | |
| Hydrocarbon resin (aliphatic) | 27.5 | 14.6 | 18.0 | 22.2 | 21.5 | 31.8 | 19.7 | 17.9 |
| Epoxy Resin | 7.3 | 7.5 | 8.5 | 0 | | 13.7 | 8.1 | |
| Polybutene I | 18.5 | 24.5 | 18.0 | 13.7 | 22.0 | | 16.4 | 19.6 |
| Polybutene II | | | | | | 13.7 | | |
| Hydrocarbon resin (aromatic) | 5.5 | | | | | | 8.1 | 3.6 |
| Finely divided calcium carbonate | 14.2 | 41.0 | 35.5 | 25.3 | 35.5 | 27.2 | 14.4 | 20.8 |

TABLE II-continued

| Component | Example sealant composition | | | | | | | |
|---|---|---|---|---|---|---|---|---|
| | 1 | 2 | 3 | 4 | 5 | 6 | 7 | 8 |
| Carbon black | 8.0 | 0.8 | 1.0 | 1.0 | 1.0 | | | 2.5 |
| Titanium pigment | | | | | | | 1.9 | 3.0 |
| Paraffin wax 1 | | 2.7[(1)] | | | | | | |
| Zinc oxide | | | | | | | 3.0 | 2.9 |
| Paraffin wax 2 | | | 3.5 | 2.0 | 3.5 | | | |
| Paraffin wax 3 (MP130) | | | | | | | | 2.1 |
| Stabilizer 1 | | | 0.5 | | 0.5 | | | |
| Polyethylene | | | | | | | 7.2 | 4.8 |
| Flatting Agent | | | | | | | 1.5 | |
| Total: | 100.0 | 100.0 | 100.0 | 100.0 | 100.0 | 100.0 | 100.0 | 100.0 |

In Tables I and II, the various materials used are identified as follows:

Block Copolymer 1 was Kraton G 1652, which is understood to be a polystyrene-saturated polyolefine-polystyrene block copolymer (S-EB-S), in which the polyolefin rubber provides about 70% by weight of the copolymer, having a specific gravity of 0.91, a solution viscosity of 150 cps at 15% solids in Toluene and 2,500 at 25% solids in Toluene, tensile at break of 6500 psi, elongation at break of 500%, a 100% modulus of 730 psi, and a Shore A hardness of 75.

Block Copolymer 2 was Kraton G 1650, which is understood to be a S-EB-S block copolymer material similar to Kraton G 1652 but of higher molecular weight and higher viscosity namely a solution viscosity of 350 cps at 15% solids and 8500 at 25% solids, tensile at break of 6000 psi, elongation at break of 500%, and a 100% modulus of 950 psi.

The hydrocarbon resin (aliphatic nature) was Escorez 5310, which is believed to be a hydrogenated polycyclopentadiene resin.

The tertiary amine was DMP 30 which is believed to be 2,4,6-Trisdimethylaminomethyl phenol.

The heat reactive phenolic resin was Schennectady SP 1045.

The hydrocarbon resin (aromatic nature) was Piccotex LC which is believed to be a styrene resin, having a melting point of about 90° C.

Stabilizer 1 was pentaerythrityl-tetraKis-[3-(3,5-di-tert.butyl-4-hydroxyphenyl)-propionate].

Stabilizer 2 was a polymeric hindered phenol.

Stabilizer 3 was a benzotriazole derivative.

The silane was Silane Z6020 which is believed to be predominantly NH$_2$—CH$_2$—CH$_2$—NH—CH$_2$—$_3$Si OCH$_3$$_3$.

The epoxy resin used was Epikote 828 which is believed to be derived from epichlorhydrin and diphenylol-propane, has an epoxide equivalent of about 190, a viscosity at 25° C. of 100 to 600 poise, and an average molecular weight of 370.

Polybutene I used was Indopol H300 which is believed to have a mean molecular weight of 1220.

Polybutene II used was Indopol H3500 which is believed to have a mean molecular weight of 3000.

Paraffin wax 1 was paraffin 10805 which is believed to be a fully refined paraffin of melting point 56° C. to 58° C.

Paraffin wax 2 was Texaco Wax HP104 which is believed to be a hard paraffin of melting point 94° C. to 98° C.

Paraffin wax 3 used was Texwax MP130, which is believed to be paraffin wax having a melting point of 65° C. to 70° C.

The polyethylene used was Alkathene 15023 which is believed to be a low molecular weight polyethylene having a Vicat softening point 65° C.

The flattening agent used was OK412 which is supplied by DeGussa as a flattening agent.

TABLE III

| Sample Set | Test Results - Example I | | | |
|---|---|---|---|---|
| | First | Second | Third | Fourth |
| Primer Example (Table I) | — | — | 4 | 1 |
| Sealant Example (Table II) | 1 | 1 | 1 | 1 |
| First Group | | | | |
| Maximum load | 1.9Kp/cm$^2$ | 2.6Kp/cm$^2$ | 8.3Kp/cm$^2$ | 10.6Kp/cm$^2$ |
| Maximum elongation | <50% | <50% | 280% | 400% |
| Type of failure | A | A | A | C |
| Second Group | | | | |
| Maximum load | 1.7Kp/cm$^2$ | 1.7Kp/cm$^2$ | 2.5Kp/cm$^2$ | 9.2Kp/cm$^2$ |
| Maximium elongation | <50% | <50% | <50% | 350% |
| Type of failure | A | A | A | C |

Type of failure A indicates adhesive failure between glass and sealant.
Type of failure C indicates cohesive failure of the sealant.

The results shown in Table III indicate that a low quality adhesive bond is achieved in the absence of pretreatment of the glass plates. Although initial adhesion can be improved by heat treatment of the samples, exposure of the second set of samples to the test of the second group yields values the same as those achieved with the first set where no heat treatment of the sample was employed. Provision of a layer of the example primer composition 4 as a pretreatment yields seals of much improved adhesive strength and elongation under the test conditions of the first group, but these values are much reduced on exposure of the third set of samples to the second group test. Provision of a layer of example primer composition 1 as a pretreatment yields seals of further improved adhesive strength and elongation under the test conditions of both the first and second groups. Indeed, the results show that cohesive failure of the seal occurred in preference to failure of the sealant to glass adhesive bond, thus allowing opportunity to take fuller advantage of the elongation properties of the sealant.

EXAMPLE II

In this example the adhesion was examined of sealant compositions employing example sealant compositions 3, 4 and 5 (see Table II) with and without example primer compositions 2, 5 or 6 (Table I). A set of sample bonds of a commercially available butyl rubber based hot melt double glazing sealant (the sixth set) was also tested for comparative purposes. Sets of samples of glass to aluminium bonds were made by providing a thin layer of the example primer (if used) on a cleaned glass plate 40 mm wide, placing two "stops" 2 mm thick adjacent ends of the plate, placing on the plate between the stops a foil of the sealant composition 4 mm thick by 25 mm wide, and placing on the foil an aluminium strip 40 mm wide having a thin layer of the primer composition (if used). The assembly was heated to 180° C. for 30 seconds and subjected to 1 Kp pressure so that the final thickness of the sealant layer was 2 mm. Sealant extruded from the test piece was stripped off and the sample allowed to cool to room temperature. Example primer compositions and sealant compositions were used as shown in Table IV to prepare sets of sample bonds; in preparing the fourth, fifth and sixth sets of sample bonds no treatment of the glass was effected prior to application of the hot melt. Four groups of samples were aged in the following way. First and second groups were aged as the first and second groups respectively described in Example I. The third group was aged for two weeks at 70° C. The fourth group was aged (using a Xenotest 150 device) for two weeks at 65% relative humidity at about 35° C.; during this time at 25 minute intervals the samples were subjected to a water spray for 5 minutes, and the samples were continuously exposed to radiation of a spectral energy distribution similar to that to the sun through a series of filters. The sample sets, after ageing, were subjected to a peel test according to U.S.A. specification TT-S-00230C (COM-NBS) (180° C. peel angle, speed 50 mm/min., width of sample 40 mm) to determine the force required to peel apart the sample and to determine the mode of failure. Tests were carried out on samples from each of the six sample sets in the first group. It is observed that the force required to peel the first sample set in the first group is far in excess of that required for the others in this group, and that the adhesion is sufficiently good to permit cohesive failure. It is noted that high peel values and cohesive nature of the failure are repeated in the second, third and fourth group tests for the first sample set.

TABLE IV

| Sample Set | Peel Test Results - Example II | | | | | |
|---|---|---|---|---|---|---|
| | First | Second | Third | Fourth | Fifth | Sixth |
| Primer Example (Table I) | 2 | 5 | 6 | — | — | — |
| Sealant Example (Table II) | 3 | 5 | 5 | 3 | 4 | Comp. |
| First Group | | | | | | |
| Force in Kp/4cm | 85 | 0 | 33 | 7 | 21 | 6 |
| Failure | C | A | C/A | A | A | C |
| Second Group | | | | | | |
| Force in Kp/4cm | 70 | | | | | 5 |
| Failure | C | | | | | C |
| Third Group | | | | | | |
| Force in Kp/4cm | 85 | 20 | | | | |
| Failure | C | A | | | | |
| Fourth Group | | | | | | |
| Force in Kp/4cm | 90 | | | | | 6 |
| Failure | C | | | | | C |

C = Cohesive failure
A = Adhesive failure

EXAMPLE III

In this example, the moisture vapor transmission rates (as defined) of example sealant composition 6, 7 and 8 (Table II) were examined by a method according to DIN 53122 (test conditions A, 20° C.±1° C., 90% relative humidity).

Results of these tests are shown in Table V, together with results of another test at 60° C., 100% relative humidity on example sealant composition 3 and comparative sample 2, a commercially available hot melt sealant based on butyl rubber. From these test results, it is concluded that the moisture vapor transmission rates of the example sealants are good, and comparable with that of commercially available butyl sealant. The results given for example sealant compositions 7 and 8 indicate an MVTR value of less than 0.1 grams per square meter per day measured at 25° C. according to DIN 53122.

TABLE V

| | Test Results - Example 3 | | | | |
|---|---|---|---|---|---|
| Test Conditions | 20° C. 90% RH | | | 60° C. - 100% RH | |
| Example Sealant Composition | 6 | 7 | 8 | 3 | |
| Comparative sample: | | | | | 2 |
| MVTR (g/m²/day) | 0.03 | 0.06 | 0.01 | 3 to 5 | 3 to 5 |

The moisture vapor transmission rate as defined of each of the example sealants were examined by a method according to DIN 53122 (test conditions A, 38° C.±1° C., 90% relative humidity). Results of these determinations are given in Table VI.

EXAMPLE IV

In this example, certain physical properties of the example sealant composition were compared with those of comparative samples 1 and 2. Melt viscosity at 150° C., 175° C. and 200° C. was measured at three shear rates using a Haake Rotovisco device. The device was set up to measure melt viscosity using the cone and plate method with the hot melt disposed between the inclined surfaces of the cone and the plate. The results are recorded in Pascal-seconds (Pa.S) in Table VI.

Shear Modulus at 20° C. was measured by a method according to DIN 53445 using a Zwick Torsiometer torsion pendulum test. The results are recorded in Table VI.

Shore Hardness "A" was measured by a method according to DIN 53505.

The tensile test was carried out by a method according to DIN 53504, standard dumbbell No. 3, speed 100 mm/min. Maximum elongation was also measured by a method according to DIN 53504.

The results of the tensile and hardness tests are shown in Table VII.

TABLE VI

| Example Sealant Composition | MVTR (g/m²/day) 38° C., 90% RH | Melt Viscosity at 150° C. (Pa.S) | Melt Viscosity at 175° C. (Pa.S) | Melt Viscosity at 200° C. (Pa.S) | Shear Modulus +20° C. | Shear Modulus −20° C. |
|---|---|---|---|---|---|---|
| 1 | 0.35 | $5.85s^{-1} = 315$<br>$11.7s^{-1} = 263$<br>$23.4s^{-1} = 218$ | $5.85s^{-1} = 87$<br>$11.75s^{-1} = 65$<br>$23.4s^{-1} = 57$ | $46.8s^{-1} = 20.6$<br>$93.6s^{-1} = 17.7$ | | |
| 2 | 0.2 | | | | | |
| 3 | 0.3 | $5.85s^{-1} = 570$<br>$11.7s^{-1} = 478$ | $5.85s^{-1} = 264$<br>$11.7s^{-1} = 198$<br>$23.4s^{-1} = 152$ | $5.85s^{-1} = 118$<br>$11.7s^{-1} = 87$<br>$23.4s^{-1} = 55$ | $63.10^6$ dyn/cm$^{-2}$ | $1800.10^6$ dyn/cm$^{-2}$ |
| 4 | 0.5 | | $5.85s^{-1} = 685$<br>$11.7s^{-1} = 575$<br>$23.4s^{-1} = 400$ | $5.85s^{-1} = 303$<br>$11.7s^{-1} = 226$<br>$23.4s^{-1} = 189$ | | |
| 5 | 0.2 | $5.85s^{-1} = 303$<br>$11.7s^{-1} = 262$<br>$23.4s^{-1} = 216$ | $11.7s^{-1} = 51$<br>$23.4s^{-1} = 50$ | $93.6s^{-1} = 9.8$<br>$187.2s^{-1} = 9.5$<br>$374.4s^{-1} = 8.6$ | | |
| 6 | 0.15 | | | $5.85s^{-1} = 790$<br>$11.7s^{-1} = 790$ | | |
| 7 | 0.5 | $5.85s^{-1} = 272$<br>$11.7s^{-1} = 205$<br>$23.4s^{-1} = 154$ | $5.85s^{-1} = 110$<br>$11.7s^{-1} = 96$<br>$23.4s^{-1} = 74$ | $46.8s^{-1} = 22.1$<br>$93.6s^{-1} = 18.9$<br>$187.2s^{-1} = 15.5$ | | |
| 8 | 0.3 | $5.85s^{-1} = 504$<br>$11.7s^{-1} = 418$<br>$23.4s^{-1} = 355$ | $5.85s^{-1} = 201$<br>$11.7s^{-1} = 165$<br>$23.4s^{-1} = 138$ | $5.85s^{-1} = 94$<br>$11.7s^{-1} = 59$<br>$23.4s^{-1} = 47$ | | |
| Comparative Example 1 | 0.1 | $5.85s^{-1} = 650$<br>$11.7s^{-1} = 468$<br>$23.4s^{-1} = 366$ | $5.85s^{-1} = 319$<br>$11.7s^{-1} = 217$<br>$23.4s^{-1} = 152$ | $11.7s^{-1} = 73$<br>$23.4s^{-1} = 47$<br>$46.8s^{-1} = 33$ | | |
| Comparative Example 2 | 0.25 | $5.85s^{-1} = 662$<br>$11.7s^{-1} = 500$ | $5.85s^{-1} = 299$<br>$11.7s^{-1} = 278$<br>$23.4s^{-1} = 226$ | $5.85s^{-1} = 189$<br>$11.7s^{-1} = 157$<br>$23.4s^{-1} = 141$ | $14.10^6$ dyn/cm$^{-2}$ | $14.10^6$ dyn/cm$^{-2}$ |

TABLE VII

| | Tensile Test and Shore Hardness A | | | | | | | |
|---|---|---|---|---|---|---|---|---|
| Example Sealant Composition | 50% elongation N/mm² | 100% elongation N/mm² | 150% elongation N/mm² | 200% elongation N/mm² | at break N/mm² | max. elongation % | Shore Hardness A 3" | Shore Hardness A 15" |
| 1 | 0.20 | 0.28 | 0.38 | 0.50 | 1.92 | 730 | 21 | 19 |
| 2 | 0.27 | 0.32 | 0.35 | 0.36 | 0.45 | 430 | 37 | 31 |
| 3 | 0.47 | 0.57 | 0.64 | 0.82 | 1.26 | 650 | 41 | 37 |
| 4 | 0.47 | 0.68 | 0.85 | 1.01 | 5.22 | 750 | 37 | 35 |
| 5 | 0.48 | 0.63 | 0.74 | 0.83 | 2.05 | 760 | 35 | 33 |
| 6 | 0.33 | 0.52 | 0.77 | 1.10 | 11.0 | 700 | 31 | 29 |
| 7 | 0.47 | 0.58 | 0.68 | 0.76 | 2.09 | 1000 | 35 | 32 |
| 8 | 0.33 | 0.49 | 0.61 | 0.70 | 1.37 | 770 | 28 | 25 |
| Comparative Example 1 | 0.09 | 0.07 | 0.06 | — | 0.01 | 800 | 5 | 1 |
| Comparative Example 2 | 0.27 | 0.24 | 0.20 | 0.13 | 0.06 | 1300 | 25 | 15 |

From these results it is concluded that the example sealant compositions can be applied as heat softenable foils or hot melts. In addition, the shear modulus at possible temperatures of use, hardness, tensile and maximum elongation results indicated that it is possible to formulate a sealant composition in which the quantities of ingredients used, especially the block copolymer hydrocarbon resin and filler may be selected to provide tough, strong, elastic, materials with virtually no cold flow and highly suitable for use in sealing double glazing units. It is observed for example that an especially desirable combination of properties including behavior as a hot melt capable of extrusion at temperatures of 150° C. to 200° C., acceptably low MVTR values, and good elasticity and hardness of the sealant at temperatures of use, is obtained with illustrative example sealant compositions 3 and 8.

EXAMPLE V

In order to demonstrate heat resistance characteristics of the example sealant compositions, samples of the third example sealant composition and of the first and second comparative examples were subjected to three loading tests at elevated temperatures. Samples for these tests comprised strips of the materials (40 mm × 10 mm × 2 mm) and the tests were carried out by suspending loads from the end of each sample. In a first test (Test 1) a load of 1.4 Newton was applied. The samples were introduced to an oven in which the air temperature was progressively increased at a rate of 4° C./minute. The temperature at which rupture of the sample occurred was determined. In a second test (Test 2) a load of 1.4 Newton was applied. The samples were maintained in an oven at a constant 40° C. The elapse of time until rupture of the sample occurred was determined. In a third test (Test 3) at load of 0.5 Newton was applied and the samples were maintained in an oven at a constant 50° C. The elapse of time until rupture of the sample was again measured. The results are recorded in Table VIII. The results show considerably improved heat resistance of the third example sealant composition as compared with the comparative examples at the test temperatures.

TABLE VIII

| Example Sealant | Heat Resistance | | |
|---|---|---|---|
| | Test 1 | Test 2 | Test 3 |
| 3 | 68° C. | 54,000 seconds | 97,200 seconds |
| Comparative Example 1 | Rupture at beginning of test | 5 seconds | Rupture at beginning of test. |
| Comparative Example 2 | 50° C. | 30 seconds | 600 seconds |

The illustrative precoated spacer articles of this invention shown in FIGS. 1 to 6 each comprise a hollow metal profile (10, 11, 12, 13, 14, 15) portions of which abut and hook over each other (18, 19, 20, 21, 22, 23), to provide an air permeable joint permitting slight compression or expansion of the spacer article in a widthwise direction. In use, the joints 18 to 23 are disposed towards the inside of the unit. The metal profiles 10 and 11 are substantially rectangular in section, the metal profiles 12 and 13 are substantially "T" shaped in section, and the metal profiles 14 and 15 are substantially "I" shaped. Each of these spacer articles has a coating of sealant composition (26, 27, 28, 29, 30, 31) on side surfaces (34, 35, 36, 37, 38, 39) of the profile. In the spacer articles of FIGS. 1, 3 and 5 the coating of sealant also covers outer surfaces (92, 93, 95) of the profiles.

Spacer articles of this invention are made by first applying to the metal profile a layer of an example primer composition. For this purpose, any of the example primer compositions 1, 2 and 3 listed in Table I may be used, but in preparing these six spacer articles example primer composition 3 was used. This solution was applied to leave, after evaporation of the solvent, a film or layer less than about 0.1 mm thick. After evaporation of the solvent, an example sealant composition is applied. For this purpose, any of the example sealant compositions 1, 2, 3, 4, 7 and 8 listed in Table II may be used, but in preparing these six spacer articles example sealant composition 2 was used. The sealant composition was applied as a hot melt at 180° C. by an extrusion process so that a coating of required shape and thickness was applied, to form a precoated spacer article of uniform geometry throughout its length. Preferably, the coatings or layers on the side surfaces (34 to 39) are slightly convex so as to minimize the possibility of entrapment of air between the spacer articles and the panes when the spacer articles are used. After cooling, the sealant composition was highly elastic and non-tacky and the precoated spacer articles could be stored and transported in bundles without recourse to special interleaving papers or the like.

In FIG. 7 there is shown a spacer article suitable for use in production of triple pane glazing units. It comprises a hollow metal profile 16 having a re-entrant slot 17 for accepting a glass pane, and has perforations 24 along surfaces intended to face towards the inner air spaces of the unit. A coating 32 of a sealant composition is provided on parallel side surfaces 33 of the profile and also on an outer surface of the profile. A deposit 43 of pressure sensitive adhesive is located in the slot 17 whereby the glass pane may be secured in place.

In one example method of using the illustrative spacer article to produce a rectangular double glazing unit, a spacer assembly was prepared from four sections of the third illustrative spacer articles (although it will be understood that any of the spacer articles of FIGS. 1 to 6 may be employed) which were cut to a desired length and contained dessicant, and were connected at their ends by clip elements in the form of corner pieces (46) (FIGS. 8 and 9) frictionally gripped within the spacer articles. End portions of the spacer articles are cut with their end surfaces 40 perpendicular to the length of the spacer article (see FIGS. 8 and 9), so as to provide a void 41 at corners of the unit. End portions of the spacer articles were heated for a few seconds by infra red radiation to soften the sealant composition on the spacers. A corner mold 42 was fitted to each corner of the assembled spacer articles. As shown in FIG. 9, this mold fits closely to the profile of the joined spacer articles and assists to define the rectangular void 41. The mold has an injection port 43 through which a sealant composition of the same formulation as that used for the spacer elements is injected as a hot melt to fill the void 41. The sealant is allowed to cool, and the mold is removed.

Two identical glass panes 45 were washed and cleaned. Peripheral portions of each pane were then provided with a thin layer comprising one of the example primers compositions. For this purpose, any of the example primer compositions 1, 2, 3 may be used, but in the illustrative method, example primer composition 3 was used. These layers were applied by progressing the panes on rollers so that their peripheral portions passed beneath an applicator 52 (FIG. 15) containing the primer composition which is in the form of a solution. A felt pad 54 transmits a required thickness of the solution to the peripheral portions of the glass pane.

After evaporation of the solvent from the primer composition, one of the panes was laid on a horizontal table, and the spacer assembly was located on the peripheral portions of the pane. The spacer assembly was fitted to the glass pane so that the periphery of the pane coated with the layer of primer composition was overlaid by the sealant composition of the spacer articles.

The second glass pane was positioned on top of the spacer assembly with its coated peripheral portions in contact with the sealant composition on the spacer articles. This double glazing unit was then passed to a heating and pressing device (FIG. 16) comprising upper and lower banks of infra red heaters 62, 64 situated above and below a plane of passage of the units, the construction and arrangement being such as to deliver, at the interfaces, between the glass and primer composition layer, and the primer composition layer and sealant composition coating sufficient heat to heat the compositions to a temperature higher than the softening points of the primer and sealant composition layers so as to soften at least their surface portions. Each edge of the unit was passed in turn between the heaters 62, 64 and the assembly was immediately passed between rollers 66, 68 set to compress the unit by about 1 mm to a required total thickness. The double glazing unit so produced was then allowed to cool and was then ready for installation.

Although in this method a particular corner construction has been described, it will be appreciated that one may employ other corner constructions for the spacer elements. For example, one may employ a spacer assembly formed by joining together, by means of corner connectors as shown in FIGS. 8 and 9, end portions of the spacer articles which are mitred so as to fit together as shown in FIG. 13, with the sealant composition coatings or layers of adjacent ends 56 in full engagement with each other at both sides of the joint. Alternatively, one may employ a spacer assembly in which the voids 41 are filled by use of a cubic corner piece 60 (FIG. 12) of appropriate size, comprising a metal frame coated with the chosen sealant composition. Alternatively, an arrangement may be employed as shown in FIG. 10, in which a close fitting corner sheath 80 is placed over the end portions of the assembled precoated spacer articles during production of the spacer assembly. The corner sheath 80 comprises triangular side portions 81 of the sealant and rectangular web portions 82 integral therewith formed from the sealant composition and reinforced with aluminium foil 83. Alternatively, an arrangement may be employed, as shown in FIG. 11, in which a close fitting corner connection 85 is inserted into end portions of the spacer articles during production of the spacer assembly. The corner connection comprises portions 86 having an external cross-section similar to the internal cross-section of the spacer articles and an integral portion 87 coated with layers of the sealant composition for engagement with the panes. Alternatively, the spacer means may comprise linear spacer articles 88 joined to corner elements 89 as shown in FIG. 16. In this arrangement the corner elements 89 are of the same construction and external cross-section as the linear spacer articles 88, and are linked and secured thereto by use of U shaped portions 90 of the sealant composition which melt and flow to fuse with the layers of sealant on the spacer articles during heating of the unit to form the seal.

Alternatively, one may complete the corner construction after the second pane is placed onto the spacer assembly. In such a procedure, any void remaining at corners of the unit are sealed by gun application of the sealant composition as a hot melt from a manual dispensing gun.

The sealant compositions were also used as hot melts by a method in which two identical glass panes were cleaned and their peripheral portions coated with a primer composition layer as described before. Spacer articles 70 (FIG. 17) of appropriate length were provided with dessicant and joined at their corners by connector pieces 46 to provide a spacer assembly as a closed figure of outer dimensions marginally less than dimensions of the glass panes. End portions 72 of spacer articles 70 were crimped onto the connectors 46. Outer surfaces 73 of the spacer articles extending from a shoulder 74 on one side of the element to a shoulder 74 on the other side of the element, were coated with a layer of the example primer composition 3, and the solvent allowed to evaporate. The spacer assembly and glass panes were positioned together with the panes and spacer assembly in register and with shoulder portions 74 of the spacer articles in contact with the glass panes, so as to provide a channel defined by the surface portions 73 of the spacer articles (extending from shoulder 74 to shoulder 74) and the coated peripheral surface portions of the panes. Example sealant composition 2 was injected under pressure as a hot melt at 180° C. to the channel entirely around the circumference of the unit, and smoothed to provide a neat appearance. The double glazing unit so produced was allowed to cool and was then ready for installation.

What we claim is:

1. A sealant system comprising an adhesive composition and a primer composition which on combination provide a cured adhesive;

said adhesive composition being a composition which is extrudable as a hot melt from about 140° C. to about 190° C. and is hardenable to yield a non-tacky, cohesive elastic mass having a moisture vapor transmission rate of not more than about 0.5 g/m²/day measured at 38° C. and comprising per hundred parts by weight of the adhesive composition, from about 5 to about 50 parts by weight of a block copolymer having two polystyrene end blocks linked to a substantially saturated polyolefin rubber midblock, from about 5 to about 50 parts by weight of an aliphatic hydrocarbon resin having a melting point not less than 60° C., from about 2 to about 40 parts by weight of a curable epoxy resin and a finely divided inorganic filler;

said primer composition comprising a heat softenable polymeric composition and an amine curing agent for the epoxy resin in the adhesive composition.

2. A sealant system comprising an adhesive composition and a primer composition which on combination provide a cured adhesive;

said adhesive composition being a composition which is extrudable as a hot melt from about 140° C. to about 190° C. and is hardenable to yield a non-tacky cohesive elastic mass having a moisture vapor transmission rate of not more than about 0.1 g/m²/day measured at 25° C. and comprising per hundred parts by weight of the adhesive composition, from about 5 to 50 parts by weight of a block copolymer having two polystyrene end blocks linked to a substantially saturated polyolefin rubber mid-block, from about 5 to about 50 parts by weight of an aliphatic hydrocarbon having a melting point of not less than about 60° C., from about 2 to about 40 parts by weight of a curable epoxy resin and, a finely divided inorganic filler;

said primer composition comprising a heat softenable polymeric composition and an amine curing agent for the epoxy resin in the adhesive composition.

3. A sealant system comprising an adhesive composition and a primer composition which on combination provide a cured adhesive and where the adhesive composition comprises per 100 parts by weight of the adhesive composition: from about 9 to about 30 parts by weight of a block copolymer having two polystyrene end blocks linked to a substantially saturated polyolefin rubber mid-block; from about 12 to about 30 parts by weight of an aliphatic hydrocarbon resin of melting point not less about 60° C.; from about 2 to about 40 parts by weight of a liquid, reactive epoxy resin; from about 10 to about 60 parts by weight of finely divided inorganic filler; from 0 to about 20 parts by weight of an aromatic hydrocarbon resin having a melting point from about 60° C. to about 130° C.; from 0 to about 40 parts by weight of a liquid polybutene; from 0 to about 15 parts by weight wax having a melting point from about 50° C. to about 120° C.; from 0 to about 1 parts by weight stabilizers; and from 0 to about 8 parts by weight carbon black, and the primer composition comprises a solution of a polymeric composition which comprises per hundred parts by weight of the primer composition; from about 10 to about 40 parts by weight of a block copolymer having two polystyrene end blocks linked to a substantially saturated polyolefin rubber mid-block; from about 0.25 to about 20 parts by weight of a tertiary amine; from about 5 to about 20 parts by weight of a phenolic resin; from about 20 to about 40 parts by weight of an aliphatic hydrocarbon resin having a melting point from about 60° to about 15° C.; from about 5 to about 40 parts by weight of an aromatic hydrocarbon resin having a melting point from about 50° C. to about 150° C.; and from 0 to about 1 parts by weight stabilizers.

4. A sealant system of claim 1 or 2 where the adhesive composition comprises from about 9 to about 30 parts by weight of the block copolymer per 100 parts by weight of the adhesive composition.

5. A sealant system of claim 1 or 2 where the adhesive composition comprises from about 14 to about 20 parts by weight of the block copolymer per 100 parts by weight of the adhesive composition.

6. A sealant system of claim 1 or 2 where the adhesive composition comprises from about 15 to about 20 parts by weight aliphatic hydrocarbon resin per 100 parts by weight of the adhesive composition.

7. A sealant system of claim 1 or 2 where the adhesive composition comprises from about 4 to about 15 parts by weight of liquid epoxy resin per 100 parts by weight of the adhesive composition.

8. A sealant system of claim 1 or 2 where the adhesive composition comprises from about 12 to about 40 parts by weight of finely divided inorganic filler per 100 parts by weight of the adhesive composition.

9. A sealant system of claim 1 or 2 where the adhesive composition comprises not more than about 8 parts by weight of carbon black per 100 parts by weight of the adhesive composition.

10. A sealant system of claim 1 or 2 where the adhesive composition comprises from 0 to about 50 parts by weight of an aromatic hydrocarbon resin having a melting point from about 60° C. to about 130° C. per 100 parts by weight of the adhesive composition.

11. A sealant system of claim 1 or 2 where the adhesive composition comprises no more than about 20 parts by weight aromatic hydrocarbon resin having a melting point between about 60° C. to about 130° C. per 100 parts by weight of the adhesive composition.

12. A sealant system of claim 1 or 2 where the adhesive composition comprises from 0 to about 40 parts by weight of a liquid polybutene per 100 parts by weight of the adhesive composition.

13. A sealant system of claim 1 or 2 where the adhesive composition comprises from about 15 to about 20 parts by weight liquid polybutene per 100 parts by weight of the adhesive composition.

14. A sealant system of claim 1 or 2 where the adhesive composition comprises from 0 to about 15 parts by weight of a wax having a melting point from about 50° C. to about 120° C. per 100 parts by weight of the adhesive composition.

15. A sealant system of claim 1 or 2 where the adhesive composition comprises from 0 to 10 parts by weight of a wax having a melting point from about 50° C. to about 120° C. per 100 parts by weight of the adhesive composition.

16. A sealant system of claim 1 or 2 where the curing agent comprises a tertiary amine.

17. A sealant system of claim 1 or 2 where the curing agent comprises 2.4.6-tris-dimethylaminomethylphenol.

18. A sealant system of claim 1 or 2 where the curing agent comprises from about 0.25 to about 20 parts by weight of the tertiary amine per 100 parts by weight of the primer composition.

19. A sealant system of claim 1 or 2 where the curing agent comprises from about 1 to about 7 parts by weight of a tertiary amine per 100 parts by weight of the primer composition.

20. A sealant system of claim 1 or 2 where the primer composition comprises from about 10 to about 30 parts by weight of a block copolymer having two polystyrene end blocks linked to a substantially saturated polyolefin rubber mid-block per 100 parts by weight of the primer composition.

21. A sealant system of claim 1 or 2 where the primer composition comprises from about 2 to about 40 parts by weight of a heat reactive phenolic resin per 100 parts by weight of the primer composition.

22. A sealant system of claim 1 or 2 where the primer composition comprises from about 5 to about 20 parts by weight of a heat reactive phenolic resin per 100 parts by weight of the primer composition.

23. A sealant system of claim 1 or 2 where the primer composition comprises from 0 to about 80 parts by weight of an aliphatic hydrocarbon resin having a melting point from about 60° C. to about 150° C. per 100 parts by weight of the primer composition.

24. A sealant system of claim 1 or 2 where the primer composition comprises from about 20 to about 40 parts by weight of an aliphatic hydrocarbon resin having a melting point from about 60° C. to about 150° C. per 100 parts by weight of the primer composition.

25. A sealant system of claim 1 or 2 where the primer composition comprises from 0 to about 80 parts by weight of an aromatic hydrocarbon resin having a melting point from about 50° C. to about 150° C. per 100 parts by weight of the primer composition.

26. A sealant system of claim 1 or 2 where the primer composition comprises from about 5 to about 40 parts by weight of an aromatic hydrocarbon resin having a melting point from about 50° C. to about 150° C. per 100 parts by weight of the primer composition.

* * * * *

UNITED STATES PATENT OFFICE
CERTIFICATE OF CORRECTION

Patent No. 4,294,733    Dated October 13, 1981

Inventor(s) Taieb Marzouki, Bernd Schwisser

It is certified that error appears in the above-identified patent and that said Letters Patent are hereby corrected as shown below:

Claim 2 - Line 27, before "50" insert -about-

Claim 3 - Line 46, before "about" first occurrence insert -than-

Claim 15 - Line 51, before "10" insert -about-

Signed and Sealed this

Ninth Day of February 1982

[SEAL]

*Attest:*

*Attesting Officer*

GERALD J. MOSSINGHOFF

*Commissioner of Patents and Trademarks*